(12) United States Patent
Ungar

(10) Patent No.: US 6,999,080 B1
(45) Date of Patent: Feb. 14, 2006

(54) SYSTEM, METHOD, AND COMPUTER PROGRAM PRODUCT FOR GENERAL ENVIRONMENT MAPPING

(75) Inventor: Paul Jeffrey Ungar, Mountain View, CA (US)

(73) Assignee: Microsoft Corporation, Redmond, WA (US)

( * ) Notice: Subject to any disclaimer, the term of this patent is extended or adjusted under 35 U.S.C. 154(b) by 352 days.

(21) Appl. No.: 09/998,380

(22) Filed: Nov. 29, 2001

Related U.S. Application Data

(60) Provisional application No. 60/253,946, filed on Nov. 30, 2000.

(51) Int. Cl.
*G06T 15/50* (2006.01)

(52) U.S. Cl. .................................... 345/426
(58) Field of Classification Search ................ 345/426
See application file for complete search history.

(56) References Cited

U.S. PATENT DOCUMENTS 5,625,762 A * 4/1997 Takizawa et al. .......... 345/591
5,704,024 A * 12/1997 Voorhies et al. ........... 345/426
6,297,833 B1 * 10/2001 Ho et al. .................... 345/581
6,384,824 B1 * 5/2002 Morgan et al. ............. 345/426
6,445,807 B1 * 9/2002 Katayama et al. .......... 382/100

OTHER PUBLICATIONS

DirectX 6.0 Goes Ballistic With Multiple New Features And Much Faster Code. Ron Fosner. Microsoft Systems Journal. 1999. http://www.microsoft.com/msj/0199/direct3d/direct3d.aspx.*
Foley et al. Computer Graphics: Principles and Practice. Addison-Wesley Publishing Company Inc. 1997. pp. 741-744.*
Blinn et al. Texture and Reflection in Computer Generated Images. Communications of the ACM. Vol. 19. No. 10. Oct. 1976.*

* cited by examiner

*Primary Examiner*—Ulka J. Chauhan
*Assistant Examiner*—Peter-Anthony Pappas
(74) *Attorney, Agent, or Firm*—Lee & Hayes, PLLC

(57) ABSTRACT

A reflection image and an environment map are loaded into memory. During rendering of an object, an environment texture sample is retrieved from the environment map based on a reflection vector stored in a pixel of the reflection image. The retrieved environment texture sample is then applied to the object. The object thus rendered is stored in a frame buffer.

11 Claims, 9 Drawing Sheets

SYSTEM, METHOD, AND COMPUTER PROGRAM PRODUCT FOR GENERAL ENVIRONMENT MAPPING

CROSS-REFERENCE TO RELATED APPLICATIONS

This application claims priority from U.S. Provisional Patent Application Ser. No. 60/253,946, entitled "System, Method, and Computer Program Product for General Environment Mapping" filed on Nov. 30, 2000.

TECHNICAL FIELD

The invention relates to computer graphics. More particularly, it relates to environment mapping.

BACKGROUND

Environment mapping is used to model interobject reflections that occur when a surface of an object reflects other objects in its surrounding environment. There are two types of environment maps that are typically used, a cube environment map and a sphere environment map.

A cube environment map has six texture images that correspond to the six faces of a cube. The center of the cube is referred to as the center of projection. At each vertex of an object (polygon) to be environment mapped, a reflection vector is computed. This reflection vector indexes one of the six texture images that make up the cube environment map. If all the vertices of the object generate reflections that point to a single texture image of the cube environment map, that texture image can be mapped onto the object using projective texturing. If an object has reflections that point to more than one texture image of the cube environment map, the object is subdivided into pieces, each of which generates reflection vectors that point to only one texture image. Because a reflection vector is not computed at each pixel, this method is not exact. Furthermore, the need to subdivide objects that generate reflection vectors that point to more than one texture image of a cube environment map precludes general environment mapping from being implemented using graphics hardware.

A sphere map on the other hand has only a single texture image. This texture image comprises a circle representing the hemisphere of the environment behind a viewer, surrounded by an annulus representing the hemisphere in front of the viewer. The texture image is that of a perfectly reflecting sphere located in the environment when the viewer is infinitely far from the sphere. At each object (polygon) vertex, a texture coordinate generation function generates coordinates that index this texture image, and these are interpolated across the object. A problem with using a sphere environment map, as compared to using a cube environment map, is that the entire sphere environment map must be undated each time the viewpoint of a computer scene changes. When using a cube environment map, only certain faces of the cube must be updated as the viewpoint changes, thus significantly reducing the time needed to update the cube environment map between each computer scene. The need to update an entire sphere environment map each time the viewpoint is changed can cause significant performance issues in computer gaming applications where the viewpoint is rapidly changing.

What is needed are new general environment mapping techniques that overcome the disadvantages and limitations described above.

SUMMARY

A system, method, and computer program product for general environment mapping are described.

In one implementation, a reflection image and an environment map are loaded into memory. During the rendering of an object, an environment texture sample is retrieved from the environment map based on a reflection vector stored in a pixel of the reflection image. The retrieved environment texture sample is then applied to the object. The object thus rendered is stored in a frame buffer. The environment mapping techniques can be implemented in real time using one or more passes through a graphics pipeline of graphics accelerator hardware cards.

DETAILED DESCRIPTION

The following discussion is directed to a system, method, and computer program product for general environment mapping. According to a described implementation, a first texture sample obtained from a texture map having reflection data is applied to an object using graphics hardware operating under the control of an application program. A second texture sample is then retrieved from an environment map based on the first texture sample. The second texture sample is applied to the object. The rendered object is stored in a frame buffer.

As used herein:

"Image" or "scene" means an array of data values. A typical image might have red, green, blue, and/or alpha pixel data, or other types of pixel data information as known to a person skilled in the relevant art.

"Pixel" means a data structure, which is used to represent a picture element. Any type of pixel format can be used.

"Reflection image" means an array of pixels, texels, or intensity values that encode reflection data. The terms reflection image, texture image, and texture map may be used interchangeably.

"Texture image" means an array of texels or intensity values. A texture image can be any array of values that is used to determine a value for a pixel. As used herein, the term "texture image" includes texture maps and environmental maps.

"Texel" means a texture element.

"Texture sample" means a sample selected from a texture map or texture image. The sample can represent one texel value or can be formed from two or more texel values blended together. Different weighting factors can be used for each texel blended together to form a texel. The terms "texel" and "texture sample" are sometimes used interchangeably.

"Texture unit" refers to graphics hardware, firmware, and/or software that can be used to obtain a texture sample (e.g., a point sample, a bilinearly filtered texture sample, or a trilinearly filtered texture sample) from a texture image.

"Real time" refers to a rate at which successive display images can be redrawn without undue delay upon a user or application. This interactive rate can include, but is not limited to, a rate equal to or less than approximately 120 frames/second. In one preferred example, an interactive rate is equal to or less than 60 frames/second. In some examples, real time can be one update per second.

Exemplary Architecture

Figure 1:
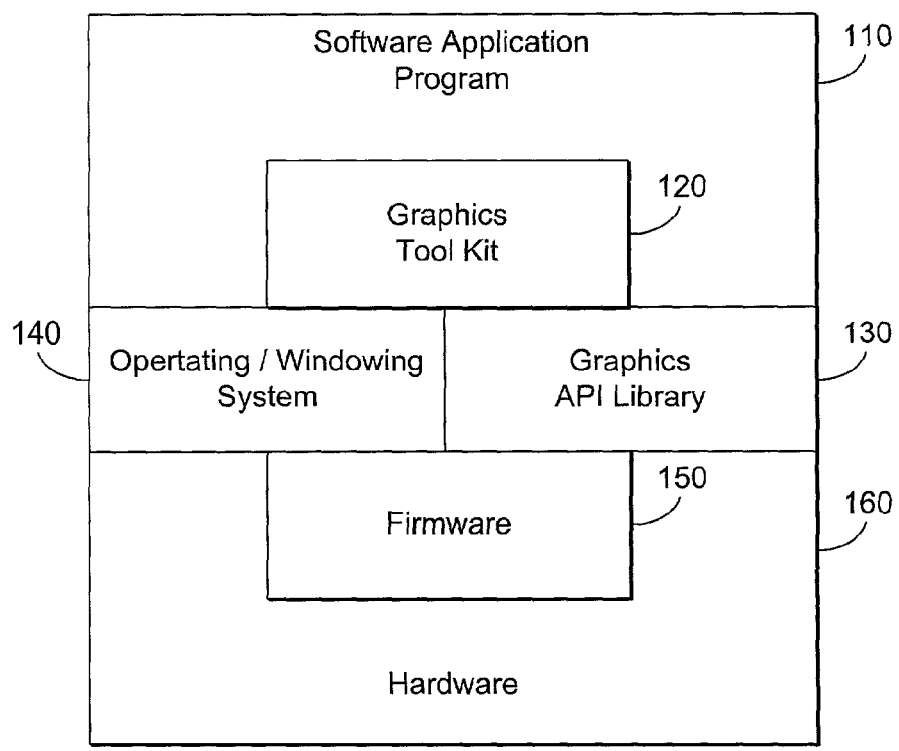
FIG. 1 illustrates an exemplary computer architecture with graphics capabilities.

FIG. 1 illustrates an exemplary computer architecture 100 having six overlapping layers. Layer 110 represents a high level software application program. Layer 120 represents a three-dimensional (3D) graphics software tool kit, such as OPENGL PERFORMER, available from Silicon Graphics, Incorporated, Mountain View, Calif. Layer 130 represents a graphics application programming interface (API), which can include but is not limited to OPENGL, available from Silicon Graphics, Incorporated. Layer 140 represents system support such as operating system and/or windowing system support. Layer 150 represents firmware. Finally, layer 160 represents hardware, including graphics hardware. Hardware 160 can be any hardware or graphics hardware including, but not limited to, a computer graphics processor (single chip or multiple chip), a specially designed computer, an interactive graphics machine, a gaming platform, a low end game system, a game console, a network architecture, et cetera. Some or all of the layers 110–160 of architecture 100 will be available in most commercially available computers.

As will be apparent to a person skilled in the relevant art after reading the description herein, various features can be implemented in any one of the layers 110–160 of architecture 100, or in any combination of layers 110–160 of architecture 100.

Exemplary Graphics System

Figure 2A:
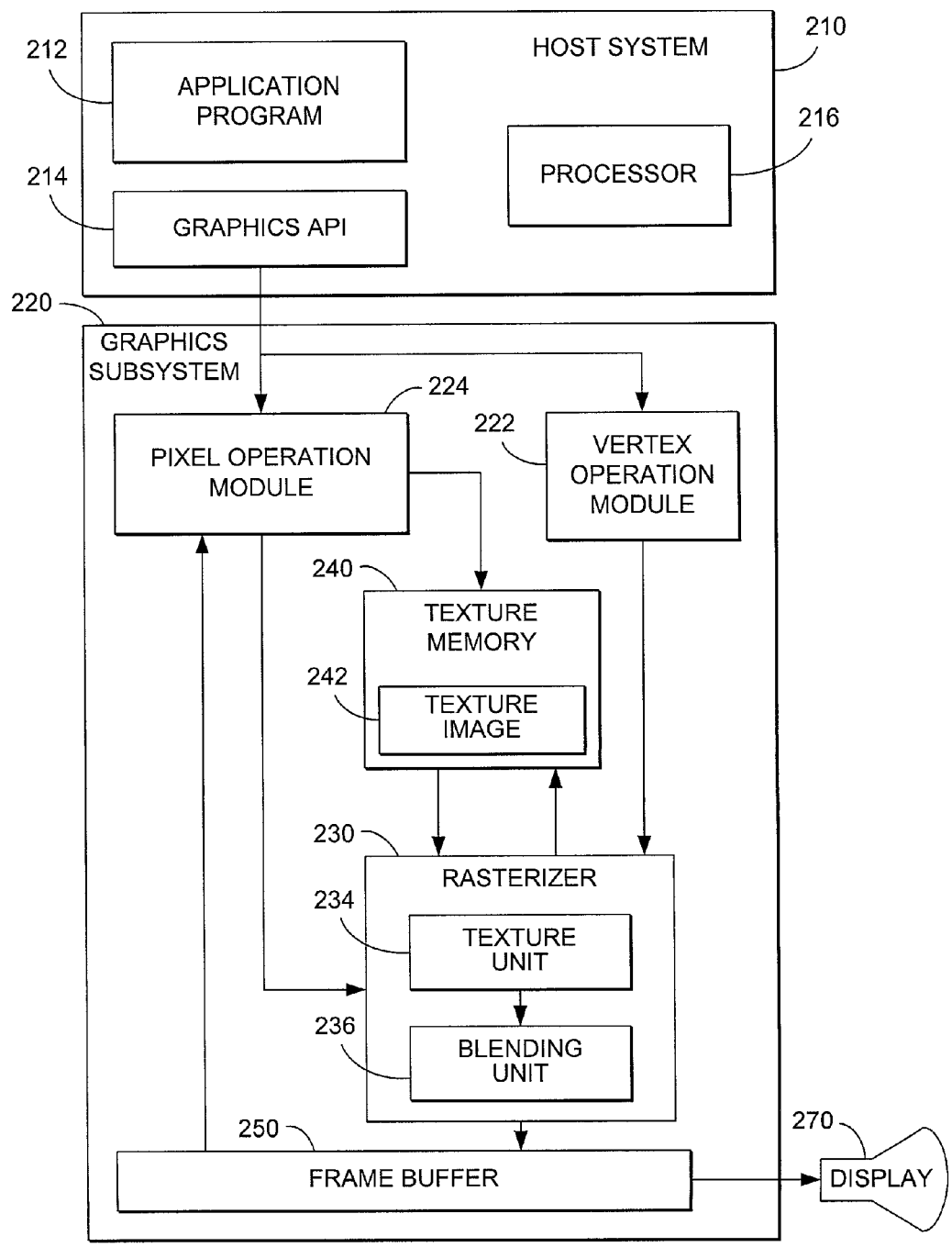
FIG. 2A is a block diagram of a graphics system.

FIG. 2A illustrates an example graphics system 200 having a host system 210, a graphics subsystem 220, and a display 270. Host system 210 includes an application program 212, a hardware interface or graphics API 214, and a processor 216. Application program 212 can be any program requiring the rendering of a computer image or scene. The computer code of application program 212 is executed by processor 216. Application program 212 assesses the features of graphics subsystem 220 and display 270 through hardware interface or graphics API 214. In this manner, the graphics subsystem 220 can be used to render an object with environment mapping under the control of application program 212.

Graphics subsystem 220 includes a vertex operation module 222, a pixel operation module 224, a rasterizer 230, a texture memory 240, and a frame buffer 250. Texture memory 240 can store one or more texture images 242. Texture memory 240 is connected to a texture unit 234 by a bus (not shown). Rasterizer 230 includes a texture unit 234 and a blending unit 236. The operation of these features of the graphics system 200 would be known to a person skilled in the relevant art given the description herein.

In one implementation, the texture unit 234 can obtain either a point sample, a bi-linearly filtered texture sample, or a tri-linearly filtered texture sample from texture image 242. Blending unit 236 blends texels and/or pixel values according to weighting values to produce a single texel or pixel. The output of texture unit 234 and/or blending module 236 is stored in frame buffer 250. Display 270 can be used to display images or scenes stored in frame buffer 250.

The graphics subsystem 220 supports a multi-pass graphics pipeline. It is capable of operating on each pixel of an object (image) during each pass that the object makes through the graphics pipeline. For each pixel of the object, during each pass that the object makes through the graphics pipeline, texture unit 234 can obtain a single texture sample from the texture image 242 stored in texture memory 240.

Figure 2B:
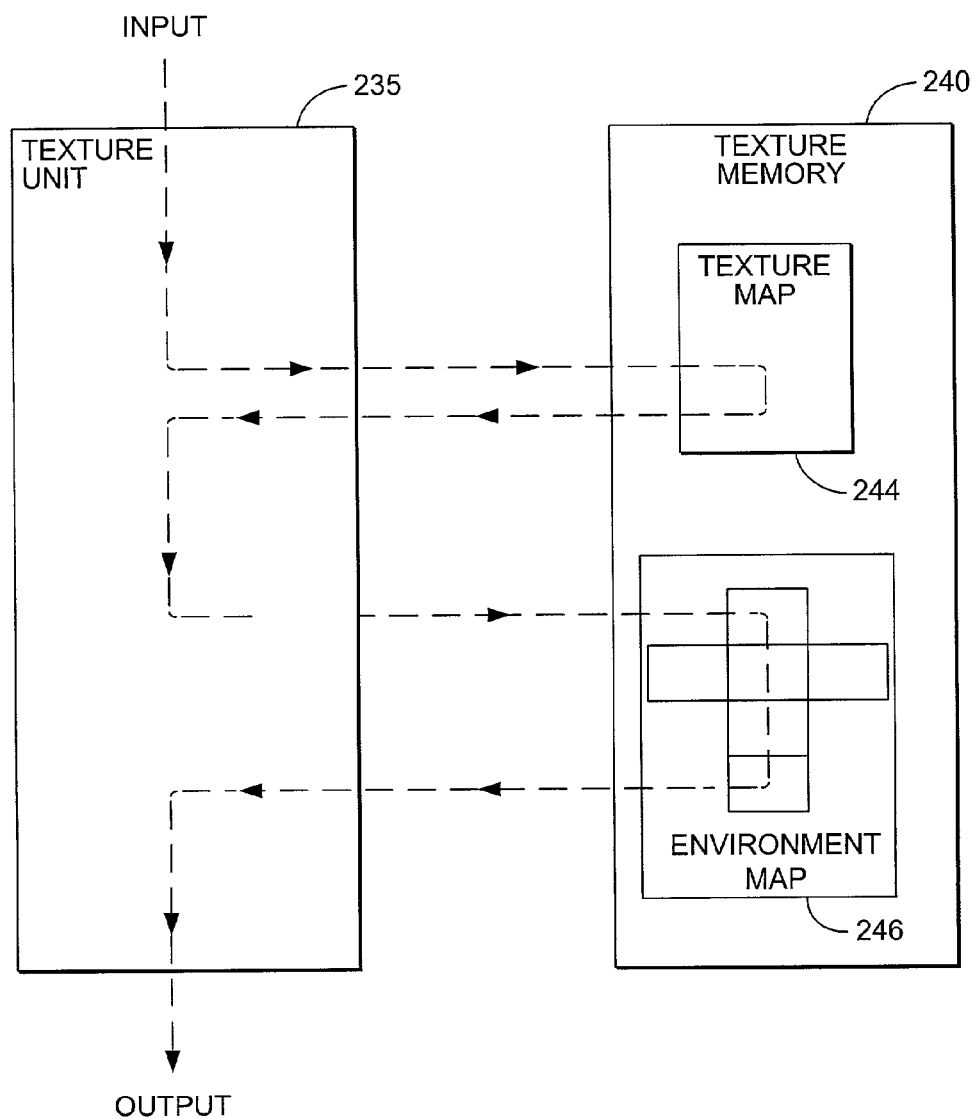
FIG. 2B is a block diagram of a texture unit and texture memory that may be employed as part of the graphics subsystem.

FIG. 2B illustrates a portion of the graphics subsystem that is configured to accommodate extraction of more than one texture sample per pass. The illustrated structure includes a texture unit 235 that accesses a texture map 244 and an environment map 246 stored in texture memory 240. For each pixel of an object, the texture unit 235 obtains two texture samples per pass from texture memory 240.

The pixels of an object are passed to texture unit 235 at an input port. The texture coordinates for a pixel of the object are used to retrieve a texture sample from the texture map 244 in texture memory 240. The retrieved texture sample contains reflection data. Next, the reflection data retrieved from texture map 244 is interpreted as a reflection vector and used to point to a texture sample contained in the environment map 246. The texture sample retrieved from the environment map 246 is applied to the pixel of the object, for example, by replacing the color data of the pixel with the texture sample data. This texture dependent texturing process occurs for each pixel of the object as each pixel is processed by texture unit 235.

Graphics Operation

Figure 3:
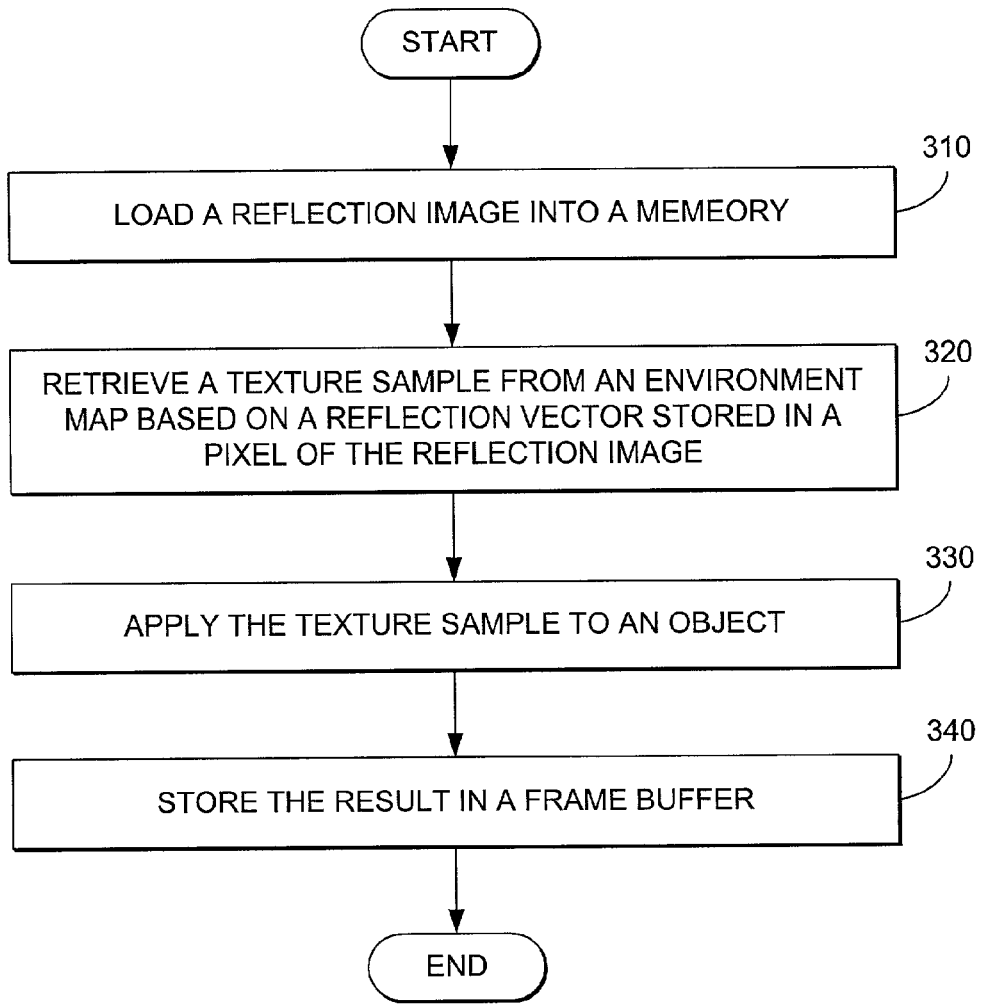
FIG. 3 is a flowchart of a graphics processing technique for environment mapping.

FIG. 3 illustrates a general environment mapping method that can be implemented by the graphics system 200 shown in FIGS. 2A and 2B. The method is described with reference to an example object, reflection information, environment mapping, and texture data illustrated in FIGS. 4–8. The example context is described first to assist the reader in understanding how the method is implemented.

Figure 4:
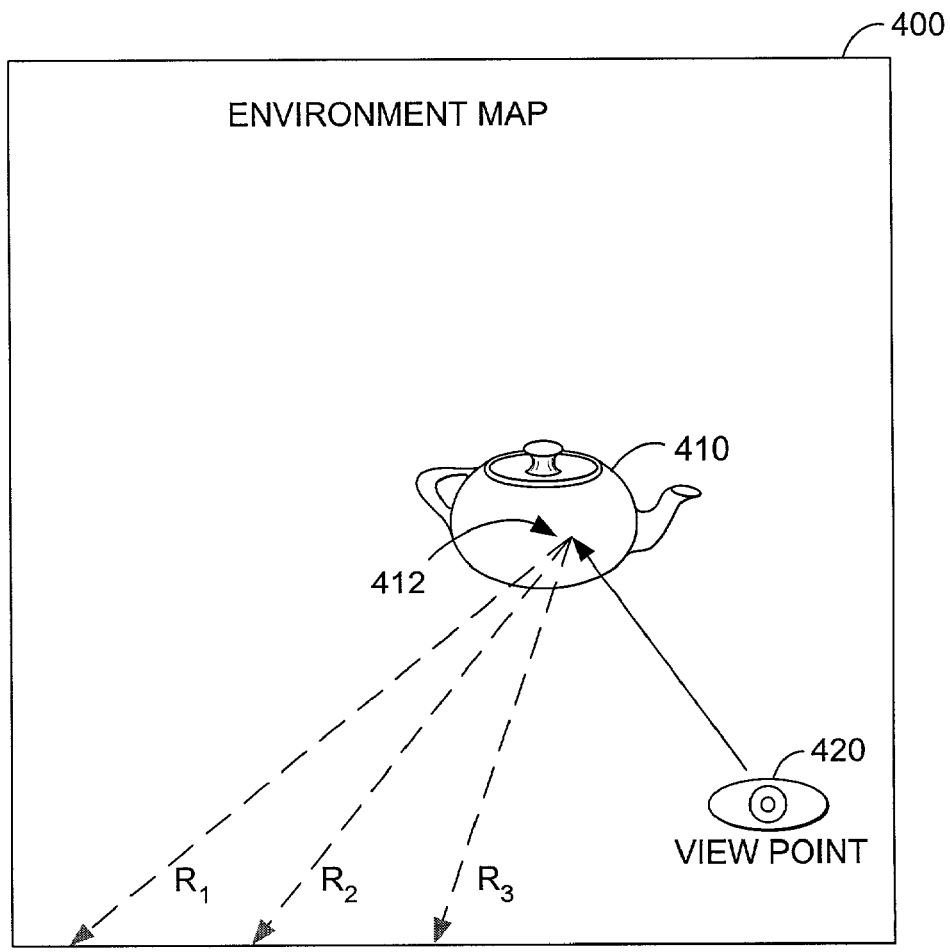
FIG. 4 illustrates a relationship between a viewpoint, an object, a reflection vector, and an environment map.

FIG. 4 illustrates the relationship between an environment map 400, an object (e.g., a teapot 410), a viewpoint 420, and three reflection vectors R1, R2, and R3. In this example, the environment map 400 is a cube environment map. However, the method of FIG. 3 is not limited to cube environment maps, but can be implemented using any environment map including, for example, sphere environment maps.

Figure 5:
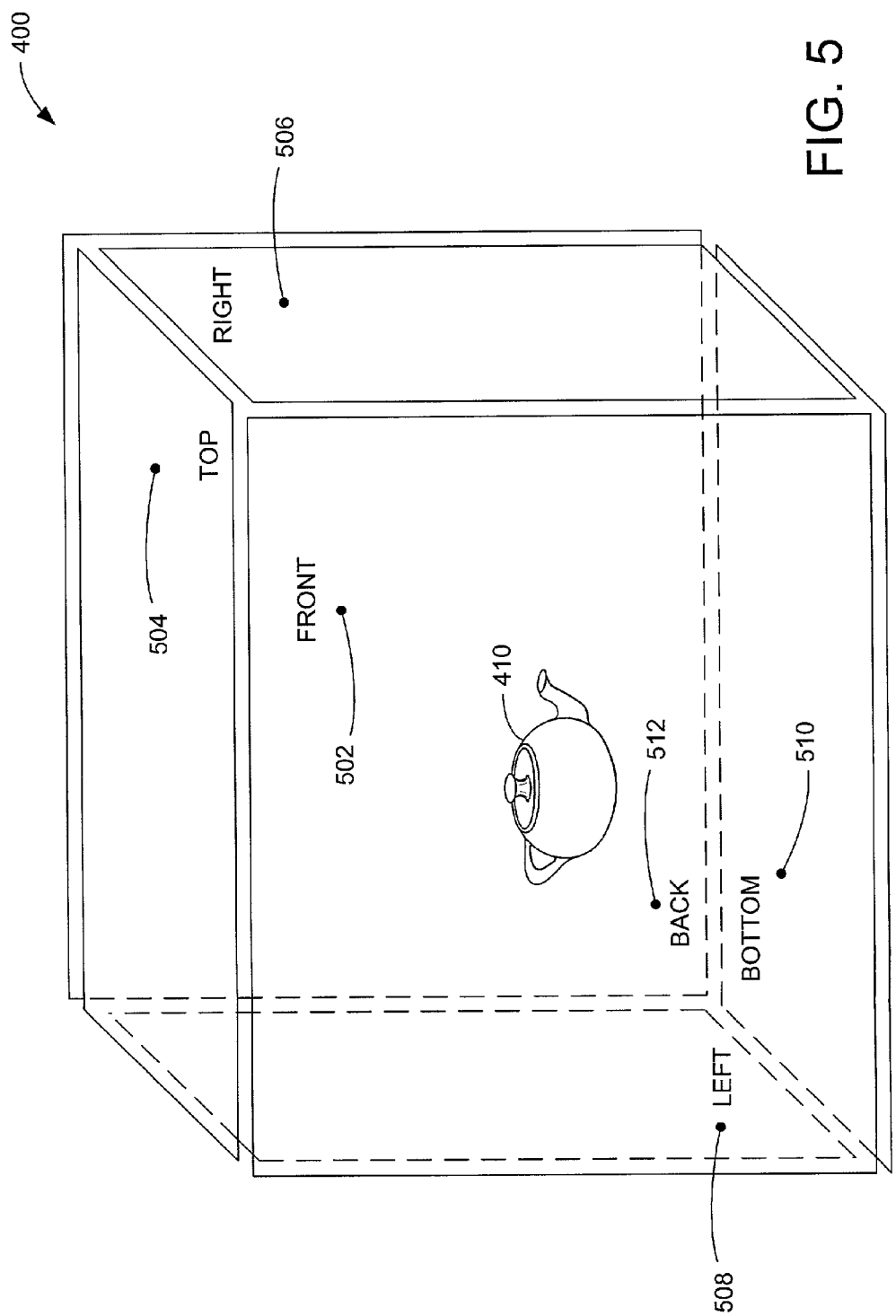
FIG. 5 illustrates a relationship between an object and a cube environment map.

FIG. 5 shows the teapot 410 located at the center of projection of the cube environment map 400. The cub environment map 400 has six faces-front 502, top 504, right 506, left 508, bottom 510, and back 512—that correspond to six texture images.

With reference again to FIG. 4, the teapot 410 is being viewed from a viewpoint 420. The teapot 410 can be modeled using polygons (e.g., triangles) in a manner that would be known to a person skilled in the relevant art. A triangular polygon (not shown) is used at location 412 to model teapot 410. The triangle has three vertices $V_1, V_2, V_3$ (not shown). Reflection vector $R_1$ is associated with vertex $V_1$. Reflection vector $R_2$ is associated with vertex $V_2$. Reflection vector $R_3$ is associated with vertex $V_3$. Reflection vectors $R_1, R_2,$ and $R_3$ each point to a texel or texture sample of cube environment map 400.

Figure 6:
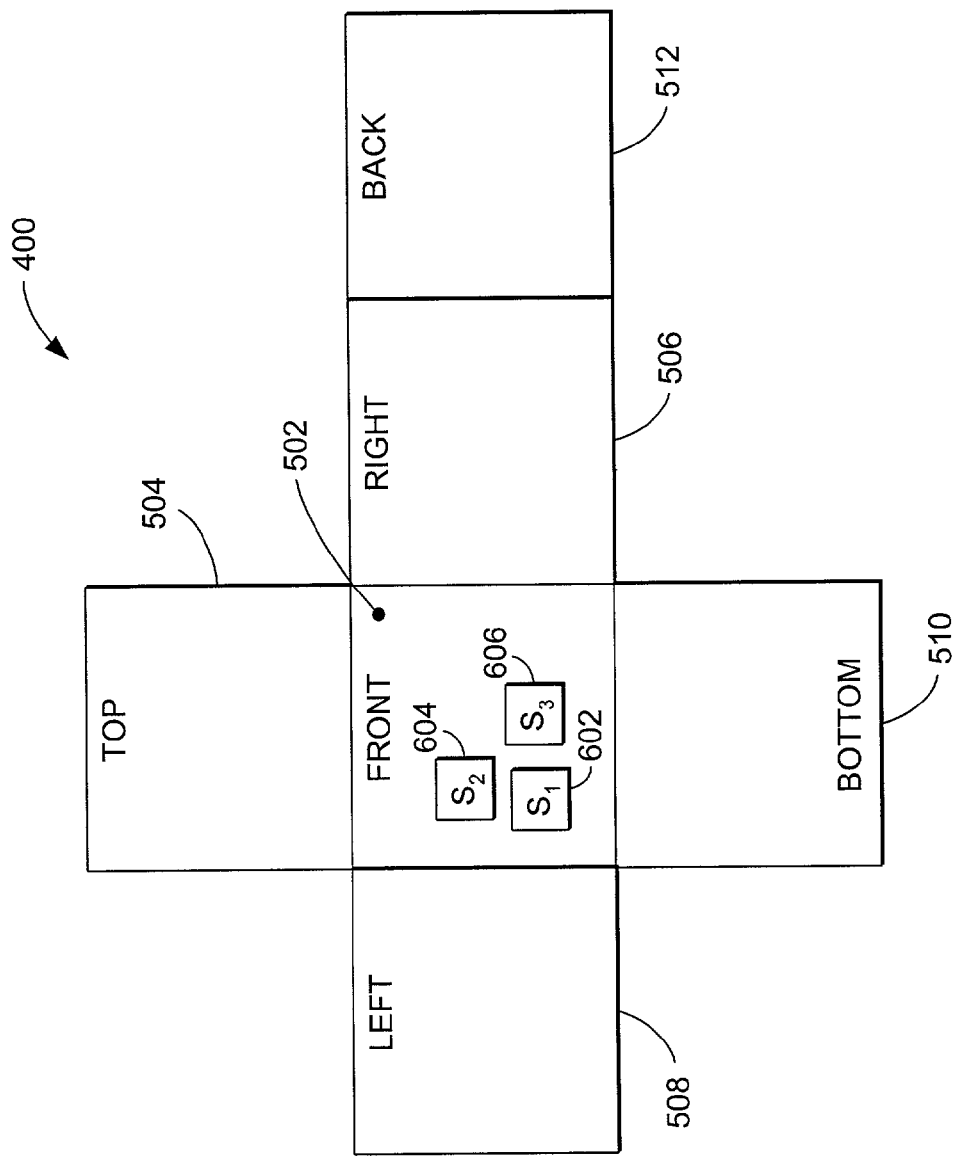
FIG. 6 illustrates the six faces of the cube environment map of FIG. 5 when laid out in two dimensions.

FIG. 6 shows the six cube faces or texture images 502, 504, 506, 508, 510, and 512 of cube environment map 400 laid out in two dimensions. In this example, texture image 502 comprises three texels 602, 604, and 606. Texel 602, which is labeled as $S_1$, is indexed or pointed to by reflection vector $R_1$. Texel 604, which is labeled as $S_2$, is indexed or pointed to by reflection vector $R_2$. Texel 606, which is labeled as $S_3$, is indexed or pointed to by reflection vector $R_3$.

Figure 7:
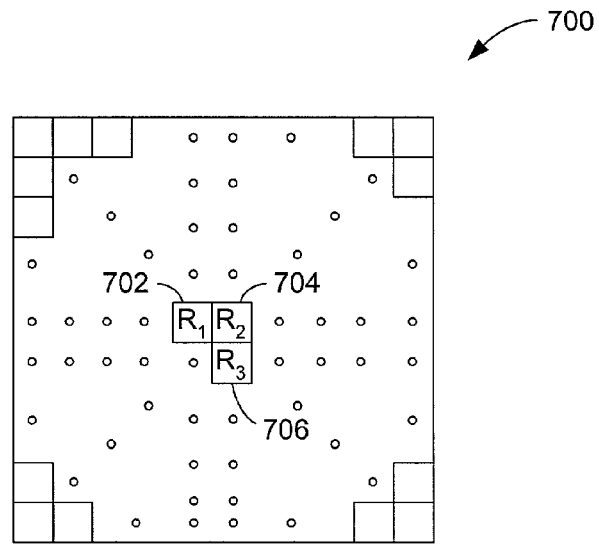
FIG. 7 illustrates an exemplary texture map.

FIG. 7 illustrates a reflection image or a texture map 700, which can be generated to specify which texture samples from environment map 400 are mapped to each pixel of teapot 410. The texture map 700 can be generated statically, or automatically on-the-fly by a procedure of application program 212 as the viewpoint of a computer scene is changed.

Texture map 700 comprises texels, each of which stores predetermined values used to represent reflection vectors. In the illustrated example, texture map 700 includes three texels 702, 704, and 706. Each texel 702, 704, and 706 comprises red, green, and blue color values. The red color value of texel 702 stores the X-component value of reflection vector R1. The green color value of texel 702 stores the Y-component value of reflection vector R1. The blue color value of texel 702 stores the Z-component value of reflection vector R1. Together, the red, green, and blue color values of texel 702 comprise the reflection vector R1. In a similar fashion, texel 704 comprises the reflection vector R2, and texel 706 comprises the reflection vector R3. The particular data format in which the values are stored (e.g., floating point values, RGB888, et cetera) is implementation dependant, as would be known to a person skilled in the relevant art given this description.

Returning to FIG. 3, the illustrated method will now be described with reference to the triangle at location 412 of teapot 410. At block 310, a reflection image or a texture map having reflection data encoded in its pixels is loaded into a memory. In the FIG. 2A implementation, the reflection image is loaded into frame buffer 250. For the FIG. 2B implementation, the reflection image is loaded into texture memory 240. The reflection image can be generated using software, hardware, or a combination of software and hardware.

Figure 8:
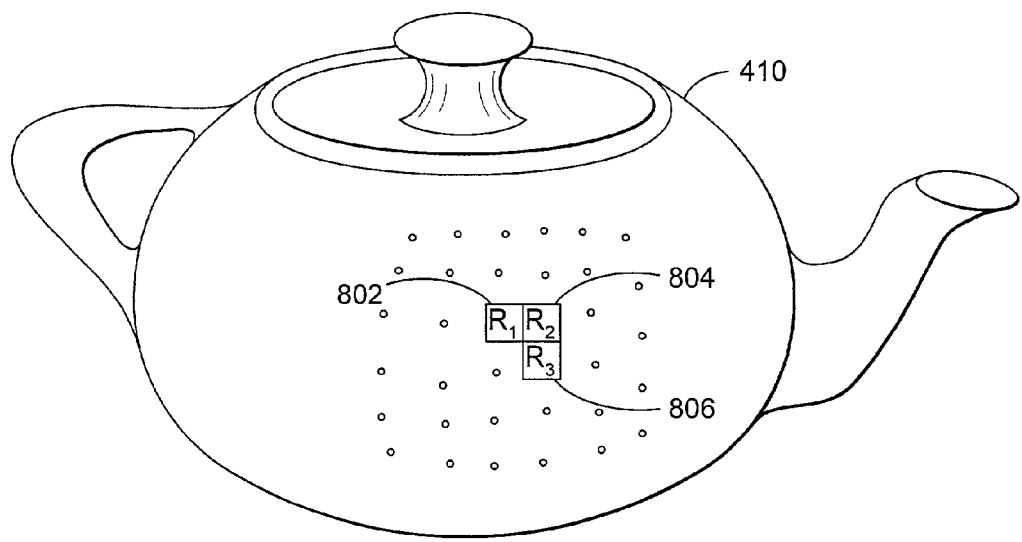
FIG. 8 illustrates application of a texture sample to the FIG. 5 object.

In one implementation, at a point in time prior to the operation of block 310, the texture map 700 is generated and stored in texture memory 240. The triangle at location 412 of teapot 410 resides in texture unit 234. Each vertex of the triangle can have an associated set of texture coordinates that are used to retrieve a texture sample from texture image 242 (i.e., texture map 700). For example, the triangle might comprise three pixels 802, 804, and 806 of teapot 410, as illustrated in FIG. 8. Pixels 802, 804, and 806 comprise red, green, and blue color values. Thus, texture unit 234 retrieves the three texels 702, 704, and 706 from texture map 700 using the texture coordinates of the triangle, and maps these three texels to pixels 802, 804, and 806, respectively, of teapot 410 as illustrated in FIG. 8. The result can then be stored in frame buffer 250.

FIG. 8 shows the texture sample retrieved from a texture image as applied to teapot 410. As each polygon or triangle that comprises the model for teapot 410 is rendered using rasterizer 230, texture unit 234 retrieves a texture sample from texture image 242 and maps the texture sample to pixels of teapot 410.

At a time prior to the operation of block 320, an environment map 400 is generated and stored in texture memory 240. At block 320, a texture sample from the environment map is retrieved based on a reflection vector stored in a pixel of the reflection image. This can be achieved, for example, by copying teapot 410 from frame buffer 250 to frame buffer 250 using a pixel copy procedure, as described below. Alternatively, for the system architecture of FIG. 2B, this can be achieved by drawing a quad (rectangle) with the reflection image as a first texture and an environment map as a second texture to be indexed via the result of a first texture lookup.

In one implementation, the texture sample is retrieved from environment map 400 based on the values of pixels 802, 804, and 806. The teapot 410 is copied from frame buffer 250 to frame buffer 250 using a pixel copy procedure. During execution of the pixel copy procedure, pixels 802, 804, and 806 pass through rasterizer 230. During this second pass through the graphics pipeline of graphics subsystem 220, the color values of pixel 802, 804, and 806 are interpreted as being the reflection vectors $R_1$, $R_2$, and $R_3$. For example, reflection vector $R_1$ points to texel 602 of environment map 400. Thus, during execution of the pixel copy procedure, texture unit 234 uses the value of reflection vector $R_1$ to retrieve texture sample $S_1$ (i.e., texel 602) from environment map 400. In a similar fashion, the value of pixel 804 is interpreted as reflection vector $R_2$ and used to retrieve texture sample $S_2$ (i.e., texel 604) from environment map 400, and the value of pixel 806 is interpreted as reflection vector $R_3$ and used to retrieve texture sample $S_3$ (i.e., texel 606) from environment map 400.

At block 330, the retrieve texture sample is applied to an object. For example, the texture samples obtained in block 320 are applied to teapot 410. In one implementation, the value of texel 602 is applied to teapot 410 by blending or accumulating it onto pixel 802 of teapot 410 stored in frame buffer 250. Texel 602 is blended or accumulated onto pixel 802 by blending texel 602 and pixel 802 according to EQ. 1 with blending module 236.

$$P_{Result}=P_1(bf)+P_2(1-bf) \qquad \text{EQ. 1}$$

where:

$P_{Result}$ is the pixel stored in frame buffer 250 after the blending operation;

$P_1$ is the texel retrieved by texture unit 234 from environment map 400;

$P_2$ is the pixel residing in frame buffer 250 before the blending operation; and bf is a predetermined blending facto.

In a similar fashion, texels 604 and 606 are applied to teapot 410 by blending them with pixels 804 and 806, respectively, according to EQ. 1. When a blending factor of one is used, the red, green, and blue color values of pixels 804 and 806 are replaced with the red, green, and blue color values of texels 604 and 608.

At block 340, the results are stored in frame buffer 250 for subsequent use. Once the results are stored in frame buffer 250, display 270 can be used to display teapot 410 to a user of application program 212. Alternatively, teapot 410 can be printed using a printer (not shown), or stored in a memory (not shown) for retrieval at a later time.

In an alternative implementation, the method can be implemented during a single pass through a graphics pipeline having texture unit 235. In this alternative implementation, prior to block 310, both a texture map 244 and an environment map 246 are generated and stored in texture memory 240. At block 310, a triangle enters texture unit 235 at the input port. The texture coordinates associated with 11 the vertices of the triangle are then used to retrieve a texture sample comprising reflection data from texture map 244.

Unlike the method above, however, the result is not stored in frame buffer 250. Rather, texture unit 235 uses the texture sample obtained from texture map 244 to immediately retrieve a second texture sample from environment map 246 (block 320), which is applied to the triangle (block 330). The output of texture unit 235 is stored in frame buffer 250 (block 340). A graphics processing unit capable of performing the texture dependent texturing process described herein is the NVIDIA GEFORCE2 ULTRA, available from NVIDIA Corporation of Santa Clara, Calif.

The methods described herein can also be used to create computer scenes having unique image qualities. For example, in an optional operation of the method, the reflection vector data described herein can be perturbed prior to retrieving a texture sample from environment map 400 using pixel operation module 224. By perturbing the reflection vectors, it is possible to create, for example, water ripple effects in an image generated using an environment map for water. How to perturb the reflection vectors to create ripple effect or other unique image qualities would be known to a person skilled in the relevant art given the description herein.

It is noted that texture maps can be generated in advance of running application program 212, and loaded during the execution of an application program 212 to permit application program 212 to execute in real time. Several texture maps can be created for predetermined views within an environment and stored for subsequent retrieval when application program 212 is executing. Furthermore, a procedure of application program 212 can modify available texture maps during execution of application program 212 to generate new texture maps 11 corresponding to particular viewpoints.

It is further noted that ad hoc reflection vectors can be supplied over an object in order to induce arbitrary lookups into an environment map. Furthermore, these reflection vectors may by supplied and used per pixel. In this manner, the graphics techniques can be used to simulate reflections from a bumpy surface by providing perturbed reflection vectors, or to simulate refraction of light from the environment by providing "pseudo" reflection vectors that really represent refraction directions.

Exemplary Computer System

Figure 9:
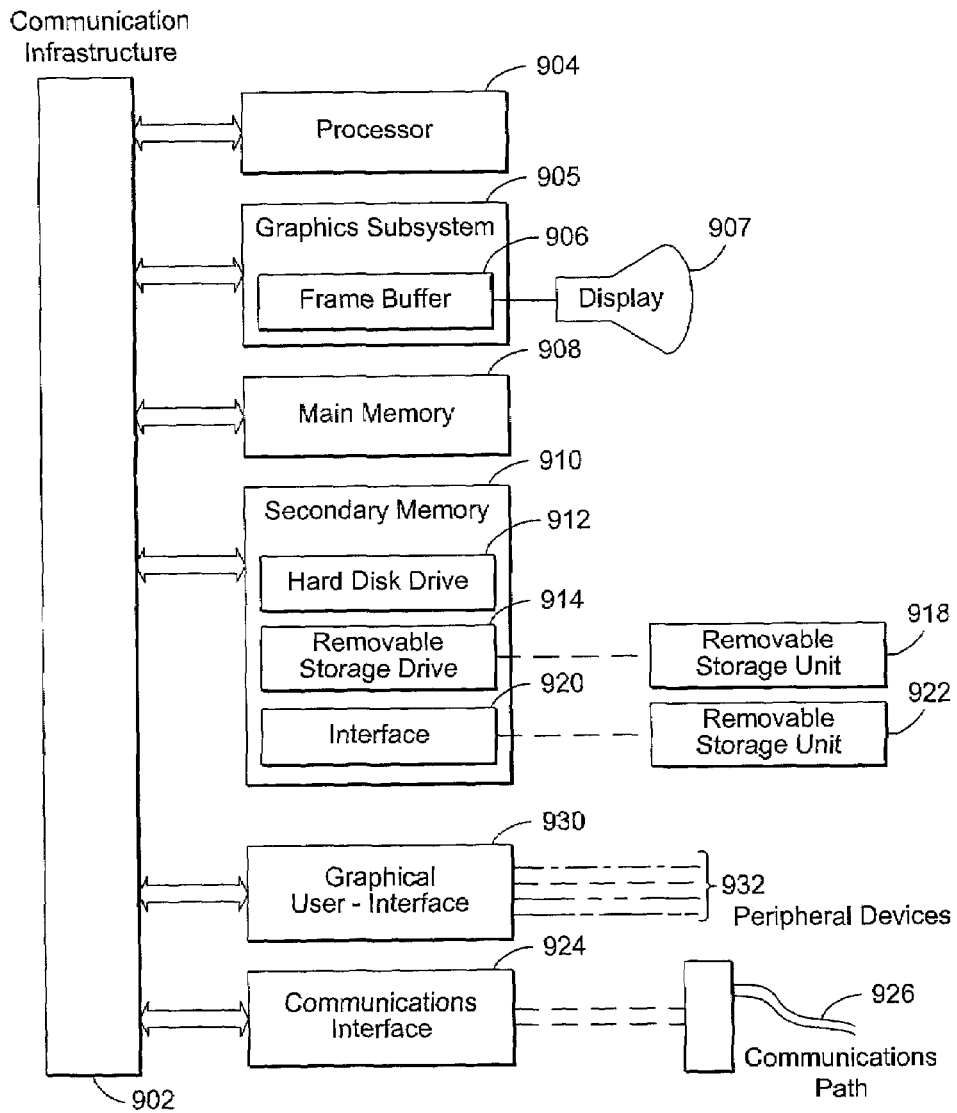
FIG. 9 illustrates an exemplary computer system that can be used to implement the FIG. 1 architecture.

FIG. 9 shows an example computer system 900, which can be used to implement the graphics system and methodology (including hardware and/or software) described above. The computer system is illustrative and not intended to be limiting. Computer system 900 represents any single or multi-processor computer. Single-threaded and multi-threaded computers can be used. Unified or distributed memory systems can be used.

Computer system 900 includes one or more processors, such as processor 904, and one or more graphics subsystems, such as graphics subsystem 905. One or more processors 904 and one or more graphics subsystems 905 can execute software and implement all or part of the features described herein. Graphics subsystem 905 can be implemented, for example, on a single chip as a part of processor 904, or it can be implemented on one or more separate chips located on a graphic board. Each processor 904 is connected to a communication infrastructure 902 (e.g., a communications bus, cross-bar, or network). After reading this description, it will become apparent to a person skilled in the relevant art how to implement the described implementations using other computer systems and/or computer architectures.

Computer system 900 also includes a main memory 908 (e.g., random access memory (RAM)) and secondary memory 910. The secondary memory 910 can include, for example, a hard disk drive 912 and/or a removable storage drive 914, representing a floppy disk drive, a magnetic tape drive, an optical disk drive, etc. The removable storage drive 914 reads from and/or writes to a removable storage unit 918 in a well-known manner. Removable storage unit 918 represents a floppy disk, magnetic tape, optical disk, etc., which is read by and written to by removable storage drive 914. As will be appreciated, the removable storage unit 918 includes a computer usable storage medium having stored therein computer software and/or data.

Secondary memory 910 may further include other similar means for allowing computer programs or other instructions to be loaded into computer system 900. Such means can include, for example, a removable storage unit 922 and an interface 920. Examples can include a program cartridge and cartridge interface (such as that found in video game devices), a removable memory chip (such as an EPROM, or PROM) and associated socket, and other removable storage units 922 and interfaces 920 which allow software and data to be transferred from the removable storage unit 922 to computer system 900.

In the illustrated example, computer system 900 includes a frame buffer 906 and a display 907. Frame buffer 906 is in electrical communication with graphics subsystem 905. Images stored in frame buffer 906 can be viewed using display 907.

Computer system 900 can also include a communications interface 924. Communications interface 924 allows software and data to be transferred between computer system 900 and external devices via communications path 926. Examples of communications interface 924 can include a modem, a network interface (such as Ethernet card), a communications port, etc. Software and data transferred via communications interface 924 are in the form of signals which can be electronic, electromagnetic, optical or other signals capable of being received by communications interface 924, via communications path 926. Note that communications interface 924 provides a means by which computer system 900 can interface to a network such as the Internet.

Computer system 900 can also include one or more peripheral devices 932, which are coupled to communications infrastructure 902 by graphical user-interface 930. Example peripheral devices 932, which can from a part of computer system 900, include, for example, a keyboard, a pointing device (e.g., a mouse), a joy stick, and a game pad. Other peripheral devices 932, which can form a part of computer system 900, will be known to a person skilled in the relevant art given the description herein.

The graphics system and method can be implemented using software running (that is, executing) in an environment similar to that described above with respect to FIG. 9. In this document, the term "computer program product" is used to generally refer to removable storage unit 918, a hard disk installed in hard disk drive 912, or a carrier wave or other signal carrying software over a communication path 926 (wireless link or cable) to communication interface 924. A computer useable medium can include magnetic media, optical media, or other recordable media, or media that transmits a carrier wave. These computer program products are means for providing software to computer system 900.

Computer programs (also called computer control logic) are stored in main memory 908 and/or secondary memory 910. Computer programs can also be received via communications interface 924. Such computer programs, when executed, enable the computer system 900 to perform the methods discussed herein. In particular, the computer programs, when executed, enable the processor 904 to perform the processes and techniques described herein. Accordingly, such computer programs represent controllers of the computer system 900.

Any software used to facilitate the graphics functionality may be stored in a computer program product and loaded into computer system 900 using removable storage drive 914, hard drive 912, or communications interface 924. Alternatively, the computer program product may be downloaded to computer system 900 over communications path 926. The control logic (software), when executed by the one or more processors 904, causes the processor(s) 904 to perform the processes described herein.

The graphics system and/or methods described herein may be implemented primarily in firmware and/or hardware using, for example, hardware components such as application specific integrated circuits (ASICs). Implementation of a hardware state machine so as to perform the functions described herein will be apparent to a person skilled in the relevant art.

CONCLUSION

Although the invention has been described in language specific to structural features and/or methodological acts, it is to be understood that the invention defined in the appended claims is not necessarily limited to the specific features or 11 acts described. Rather, the specific features and acts are disclosed as exemplary forms of implementing the claimed invention.

What is claimed is:

1. A method comprising:
   generating a plurality of reflection images, wherein each of the plurality of reflection images corresponds to a particular viewpoint;
   loading a predetermined reflection image chosen from the plurality of reflection images into memory;
   retrieving an environment texture sample from an environment map based on a reflection vector stored in a pixel of the predetermined reflection image; and
   applying the environment texture sample to an object, wherein the loading comprises:
   retrieving a reflection texture sample comprising red, green, and blue color data; and
   storing the red, green, and blue color data of the reflection texture sample as red, green, and blue color data of a pixel of the object, and
   wherein the retrieving the environment texture sample comprises interpreting the red, green, and blue color data of the pixel as the reflection vector.

2. The method of claim 1, wherein the retrieving the environment texture sample comprises retrieving the environment texture sample comprising red, green, and blue color data from the environment map based on the interpreted reflection vector.

3. The method of claim 2, wherein the applying comprises replacing the red, green, and blue color data of the pixel with the red, green, and blue color data of the environment texture sample.

4. The method of claim 1, further comprising perturbing the interpreted reflection vector prior to retrieving the environment texture sample.

5. The method of claim 1, wherein the loading, the retrieving, and the applying are performed during a single pass through a graphics pipeline.

6. The method of claim 1, further comprising storing a result of the applying the environment texture sample to the object in a frame buffer.

7. The method of claim 1, wherein the loading is performed during a first pass through a graphics pipeline and the retrieving the environment texture sample and the applying are performed during a second pass through the graphics pipeline.

8. The method of claim 7, further comprising:
   storing the predetermined reflection image in a frame buffer; and
   replacing the predetermined reflection image in the frame buffer with a result of application of the environment texture sample.

9. The method of claim 8, wherein the loading the predetermined reflection image loads the predetermined reflection image in a texture memory and further comprising loading the environment map in the texture memory prior to performing the retrieving the environment texture sample and the applying.

10. The method of claim 1, wherein the retrieving the environment texture sample comprises retrieving the environment texture sample from a cube environment map.

11. The method of claim 1, wherein the loading, the retrieving the environment texture sample, and the applying are performed in real time.

* * * * *